US011878437B1

(12) United States Patent
Baldwin et al.

(10) Patent No.: US 11,878,437 B1
(45) Date of Patent: Jan. 23, 2024

(54) PERSONAL RAZOR FOR SHAVING

(71) Applicant: NeatNeck, LLC, Atlanta, GA (US)

(72) Inventors: Richard Baldwin, Atlanta, GA (US); Jenna Baldwin, Atlanta, GA (US); Debbie Baldwin, Atlanta, GA (US)

(73) Assignee: NeatNeck, LLC, Atlanta, GA (US)

( * ) Notice: Subject to any disclaimer, the term of this patent is extended or adjusted under 35 U.S.C. 154(b) by 0 days.

(21) Appl. No.: 18/232,422

(22) Filed: Aug. 10, 2023

Related U.S. Application Data

(60) Provisional application No. 63/502,661, filed on May 17, 2023.

(51) Int. Cl.
*B26B 21/52* (2006.01)
*B26B 21/22* (2006.01)
*B26B 21/40* (2006.01)

(52) U.S. Cl.
CPC .......... *B26B 21/527* (2013.01); *B26B 21/222* (2013.01); *B26B 21/4062* (2013.01); *B26B 21/521* (2013.01); *B26B 21/522* (2013.01)

(58) Field of Classification Search
CPC ....... B26B 21/10; B26B 21/14; B26B 21/222; B26B 21/4068; B26B 21/52; B26B 21/521–523; B26B 21/527
USPC ....... 30/47–51, 526–536; D28/45–48; D8/98
See application file for complete search history.

(56) References Cited

U.S. PATENT DOCUMENTS 971,772 A * 10/1910 Millar .................. B26B 21/527 30/526
1,104,857 A * 7/1914 Windham ............... B26B 21/16 30/527
1,201,317 A * 10/1916 Lishawa ............... B26B 21/527 30/526
2,020,043 A * 11/1935 Taylor ..................... B26B 21/32 30/526
D118,833 S * 2/1940 Pierson .......................... D28/46
2,286,553 A * 6/1942 Krigbaum ............... B26B 21/32 30/527
D146,759 S * 5/1947 Brown ........................... D28/46
D191,357 S * 9/1961 Sidney et al. ................. D28/46
3,045,342 A * 7/1962 Diehl .................... B26B 21/527 30/527

(Continued)

FOREIGN PATENT DOCUMENTS

GB 2265105 A * 9/1993 ........... B26B 21/527
GB 2465422 A * 5/2010 ........... B26B 21/527

(Continued)

*Primary Examiner* — Jason Daniel Prone
(74) *Attorney, Agent, or Firm* — H. Brock Kolls

(57) ABSTRACT

The present invention relates to a personal razor and methods of use for shaving hair. The personal razor includes a substantially V-shape body. The exterior surface has a razor cartridge interface on which a razor cartridge is attached. Retaining clips are affixed along the exterior surface securing the razor cartridge in place and orientating a razor-cutting surface to be in contact with the skin of a user during use of the personal razor. An interior surface forms two opposing entry surfaces. Ridges are disposed along each of the opposing entry surfaces that grip the finger of the user on insertion into the personal razor. The grip of the ridges on the finger of the user enables the user to better control the motion, the angle of the razor cutting surface, and the downward pressure on the skin of the user during use of the personal razor.

20 Claims, 14 Drawing Sheets

(56) References Cited

U.S. PATENT DOCUMENTS

| | | | | | |
|---|---|---|---|---|---|
| 3,078,569 | A * | 2/1963 | Sidney et al. | B26B 21/06 | 30/526 |
| 3,783,510 | A * | 1/1974 | Dawidowicz | B26B 21/222 | 30/40 |
| D310,580 | S * | 9/1990 | King | D28/46 | |
| 5,357,680 | A * | 10/1994 | Monistere | B26B 21/527 | 30/32 |
| 6,018,877 | A * | 2/2000 | Greene | B26B 21/527 | 30/526 |
| 6,029,356 | A * | 2/2000 | Sprinkle | B26B 21/527 | 30/526 |
| D431,095 | S * | 9/2000 | Hyman | D28/48 | |
| D446,351 | S * | 8/2001 | Greene | D28/46 | |
| 6,493,950 | B1 * | 12/2002 | Kludjian | B26B 21/527 | 30/526 |
| 6,550,148 | B2 * | 4/2003 | Cecil | B26B 21/527 | 30/526 |
| D484,769 | S * | 1/2004 | Cheung | B26B 21/527 | D8/98 |
| 6,694,626 | B2 * | 2/2004 | Kludjian | B26B 21/527 | 30/526 |
| 6,823,594 | B2 * | 11/2004 | Kludjian | B26B 21/527 | 30/526 |
| D612,540 | S * | 3/2010 | Joslin | D28/48 | |
| 7,805,845 | B2 * | 10/2010 | Kludjian | B26B 21/527 | 30/526 |
| 8,141,258 | B1 * | 3/2012 | Frisch | B26B 21/527 | 30/526 |
| 8,607,458 | B2 * | 12/2013 | Hosseini | B25G 1/10 | 30/526 |
| 8,782,911 | B1 * | 7/2014 | Greene | B26B 21/52 | 30/526 |
| 8,991,060 | B2 * | 3/2015 | Safar | B26B 21/527 | 30/526 |
| D802,213 | S * | 11/2017 | Contaldi | D28/48 | |
| 9,975,262 | B2 * | 5/2018 | Safar | B26B 21/4025 | |
| 10,137,586 | B1 * | 11/2018 | Strong | B26B 21/525 | |
| 2007/0251106 | A1 * | 11/2007 | Gladstone | B26B 21/527 | 30/526 |
| 2009/0277023 | A1 * | 11/2009 | Coelho | B26B 21/527 | 30/526 |
| 2010/0030040 | A1 * | 2/2010 | Poeze et al. | A61B 5/14551 | 600/316 |
| 2011/0113631 | A1 * | 5/2011 | Zdunek | B26B 21/527 | 30/34.05 |
| 2014/0290066 | A1 * | 10/2014 | Woolfson | B26B 21/521 | 30/526 |
| 2015/0367522 | A1 * | 12/2015 | Martin | B26B 21/10 | 30/526 |
| 2016/0193740 | A1 * | 7/2016 | Phillips | B26B 21/521 | 30/34.05 |
| 2018/0117781 | A1 * | 5/2018 | Gonterman | B26B 21/222 | |
| 2022/0219346 | A1 * | 7/2022 | Lichtblau | B26B 21/52 | |
| 2023/0098412 | A1 * | 3/2023 | Lumpkins | B26B 21/527 | 30/526 |

FOREIGN PATENT DOCUMENTS

| | | | | |
|---|---|---|---|---|
| WO | WO-2012120499 | A1 * | 9/2012 | B26B 21/527 |
| WO | WO-2017041120 | A1 * | 3/2017 | B26B 21/527 |

* cited by examiner

PERSONAL RAZOR FOR SHAVING

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that claims the benefit of a U.S. provisional application, Ser. No. 63/502,661, inventor Richard Baldwin, entitled "NEAT NECK", filed May 17, 2023.

TECHNICAL FIELD OF THE INVENTION

This invention relates to a personal razor and methods of use for shaving portions of the body of a user by way of a finger inserted into the personal razor to guide the razor cutting surface along the skin of the user to effectuate shaving, particularly of hard-to-reach places on the body such as the back of the neck and other places.

BACKGROUND OF THE INVENTION

Before our invention, it was difficult to shave certain areas of the body with a razor. Such areas can include behind the neck, on the shoulders or back, and in other places. While some of these areas might be easy to reach with the hand or finger of a user getting a razor blade positioned to safely trim unwanted hair in such areas is extremely difficult if not impossible.

The present invention addresses these and other shortcomings by providing a personal razor for shaving that is attachable to the finger of a user. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a personal razor for shaving which comprises a body that is substantially v-shape having a left side, a right side, an exterior surface, an interior surface, an open end, and a closed end. A portion of the exterior surface is configured as a razor cartridge interface proximate to the open end. The interior surface forms two opposing entry surfaces positioned proximate to the open end.

The personal razor further comprises at least one retaining clip affixed along the exterior surface proximate to the razor cartridge interface, and a razor cartridge is fastened by way of the retaining clip to the razor cartridge interface. The razor cartridge comprises at least one razor cutting surface that contacts the skin of a user during the use of the personal razor. At least one contoured finger guide is recessed into the exterior surface proximate to the closed end, wherein by way of the contoured finger guide the user can grip to align the personal razor when sliding 'on' or 'off' the finger of the user.

The personal razor further comprises more than one ridge disposed along each of the opposing entry surfaces with at least a portion of the ridges positioned below the razor cartridge interface, wherein a plurality of the ridges grip the finger of the user on insertion into the open end of the personal razor and orientation of the ridges below the razor cartridge enables the user to better control motion, angle of the razor cutting surface, and downward pressure on the skin of the user during use of the personal razor.

Additional shortcomings of the prior art are overcome and additional advantages are provided through the provision of a method of using a personal razor for shaving. The method comprises the steps of sliding the personal razor onto the finger of a user by way of a contoured finger guide that the user can grip to align the personal razor when sliding 'on' the finger of the user in preparation for the use of the personal razor.

The personal razor comprises a body that is substantially v-shape having a left side, a right side, an exterior surface, an interior surface, an open end, and a closed end. A portion of the exterior surface is configured as a razor cartridge interface proximate to the open end, the interior surface forms two opposing entry surfaces positioned proximate to the open end. At least one retaining clip is affixed along the exterior surface proximate to the razor cartridge interface. A razor cartridge is fastened by way of the retaining clip to the razor cartridge interface. The razor cartridge comprises at least one razor cutting surface. At least one of the contoured finger guides is recessed into the exterior surface proximate to the closed end, and more than one ridge is disposed along each of the opposing entry surfaces with at least a portion of the ridges positioned below the razor cartridge interface. Wherein a plurality of the ridges grip the finger of the user on insertion into the open end of the personal razor and the orientation of the ridges below the razor cartridge enables the user to better control motion, angle of the razor cutting surface, and downward pressure on the skin of the user during use of the personal razor.

The method continues by shaving a portion of the body of the user by moving the finger of the user allowing the razor cutting surface to contact and drag across the skin of the user. And, removing the personal razor from the finger of the user by way of the contoured finger guides, the user can grip the personal razor when sliding 'off' the finger of the user when finished shaving.

Additional shortcomings of the prior art are overcome and additional advantages are provided through the provision of a personal razor for shaving which comprises a body that is substantially v-shape having a left side, a right side, an exterior surface, an interior surface, an open end, and a closed end. A portion of the exterior surface is configured as a razor cartridge interface proximate to the open end. The interior surface forms two opposing entry surfaces positioned proximate to the open end. At least one retaining clip is affixed along the exterior surface proximate to the razor cartridge interface.

The personal razor further comprises a razor cartridge that is fastened by way of the retaining clip to the razor cartridge interface. The razor cartridge comprises at least one razor cutting surface that contacts the skin of a user during the use of the personal razor. And, more than one ridge disposed along each of the opposing entry surfaces with at least a portion of the ridges positioned below the razor cartridge interface. Many of the ridges traverse between the left side and the right side. The center portion of many of the ridges is wider and flatter than the end portions of the ridges increasing the contact surface area with the finger of the user when inserted into the interior region. Wherein a plurality of the ridges grips the finger of the user on insertion into the open end of the personal razor, and orientation of the ridges below the razor cartridge enables the user to better control motion, angle of the razor cutting surface, and downward pressure on the skin of the user during use of the personal razor.

Additional shortcomings of the prior art are overcome and additional advantages are provided through the provision of a method of using a personal razor for shaving. The method comprises the steps of sliding the personal razor on the finger of a user in preparation for the use of the personal razor.

The personal razor comprises a body that is substantially v-shape having a left side, a right side, an exterior surface, an interior surface, an open end, and a closed end. A portion of the exterior surface is configured as a razor cartridge interface proximate to the open end. The interior surface forms two of an opposing entry surface positioned proximate to the open end. At least one retaining clip is affixed along the exterior surface proximate to the razor cartridge interface. A razor cartridge is fastened by way of the retaining clip to the razor cartridge interface. The razor cartridge comprises at least one razor cutting surface that contacts the skin of a user during the use of the personal razor. And, more than one ridge is disposed along each of the opposing entry surfaces with at least a portion of the ridges positioned below the razor cartridge interface. Many of the ridges traverse between the left side and the right side. A center portion of many of the ridges is wider and flatter than the end portions of the ridge increasing the contact surface area with the finger of the user when inserted into the interior region, wherein a plurality of the ridges grip the finger of the user on insertion into the open end of the personal razor and orientation of the ridges below the razor cartridge enables the user to better control motion, angle of the razor cutting surface, and downward pressure on the skin of the user during use of the personal razor.

The method continues by shaving a portion of the body of the user by moving the finger of the user allowing the razor cutting surface to contact and drag across the skin of the user. And, removing the personal razor from the finger of the user when finished shaving.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
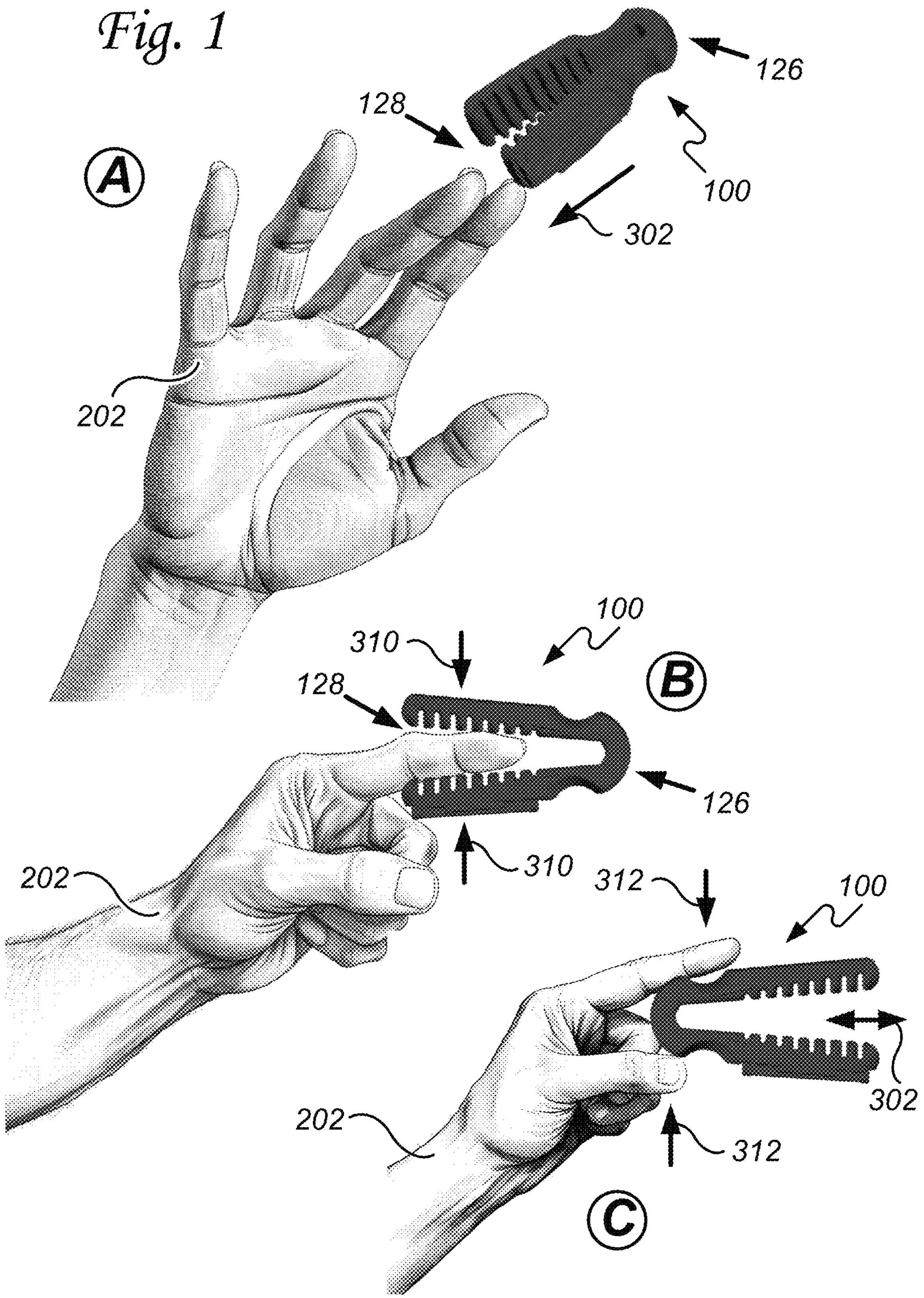
FIG. 1 illustrates one example of a personal razor being placed on the finger of a user.

Turning now to the drawings in greater detail, it will be seen that in FIG. 1 there is illustrated one example of a personal razor 100 being placed on the finger of a user 202. In an exemplary embodiment, in reference 'A' the personal razor is configured to slide 302 onto the finger of user 202. In this regard, user 202 can use their free hand to grip the closed end 126 and slide 302 the open end 128 onto one of the fingers of the user 202.

In reference 'B' on insertion of user's 202 finger into the open end 128 of the personal razor 100, opposing sets of ridges 112 are slightly forced apart creating a gripping force 310 to hold the personal razor 100 on the finger of user 202. In use, user 202 can then shave hair from a portion of their body by moving their finger to allow the razor cutting surface 108 to contact and drag across their skin. Such razor cutting surface 108 can be a razor blade or other razor cutting surfaces, as may be required and/or desired in a particular embodiment.

An advantage, in the present invention, is that the razor cartridge 110 can be positioned on the fingertip of the user 202 allowing the user 202 to reach and shave in hard-to-see or reach areas such as behind the neck, shoulders, back, and in other places. Additionally, by adjusting the hand and/or flexing a finger, user 202 can easily align as well as control the contact pressure on the skin of the razor cutting surface 108 to shave contoured and other delicate parts of the body where the blade angle and blade pressure on the skin matter for a proper shave absent cuts and excessive skin irritation.

Figure 2:
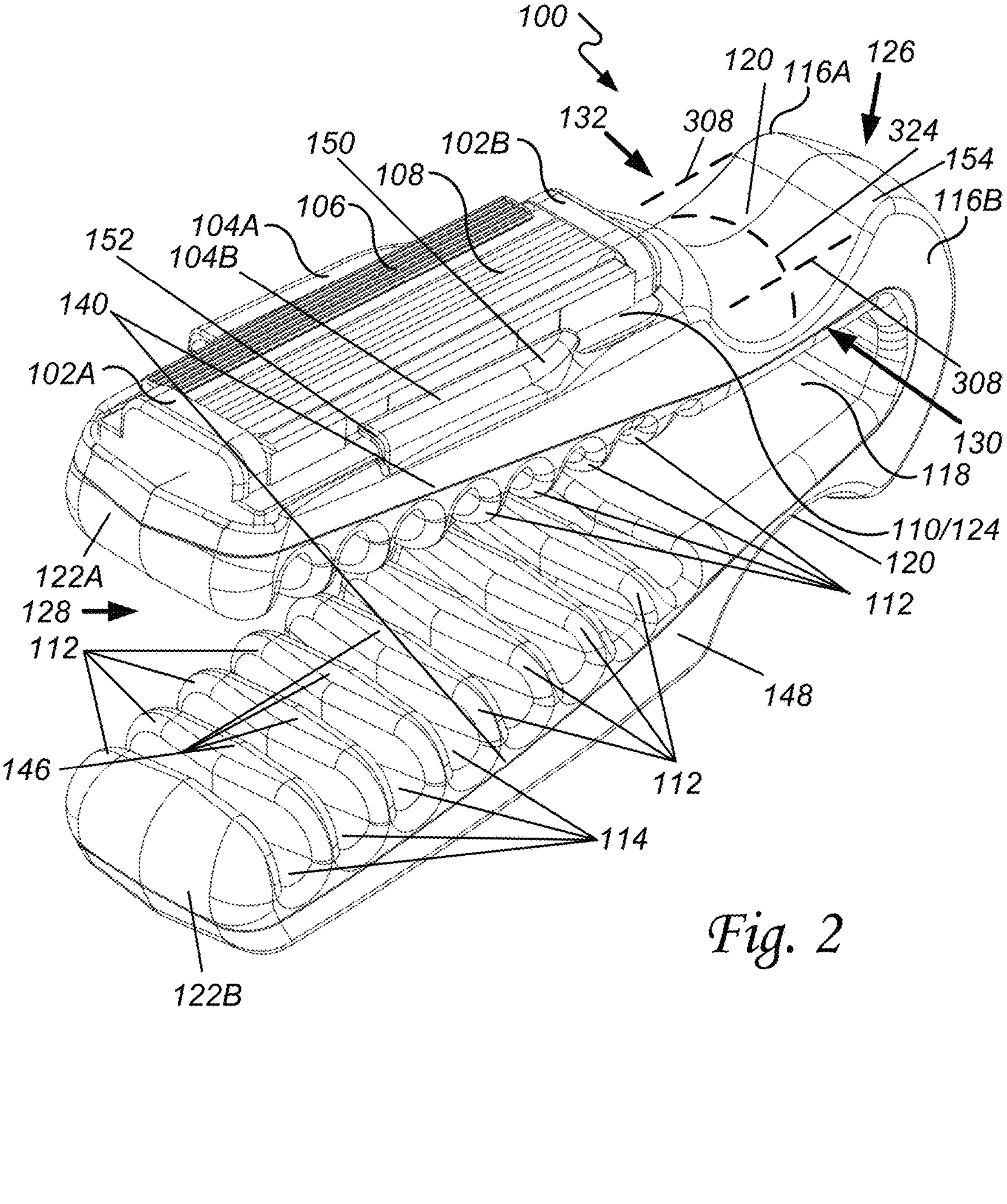
FIG. 2 illustrates one example of a perspective view of a personal razor.

In reference 'C', at the closed end 126, contoured finger guides 120 can be recessed 308 into the exterior surface 136 proximate to the closed end 126 as better illustrated in at least FIG. 2. During use, by way of the contoured finger guides 120 user 202 can grip 312 to align the personal razor 100 when sliding 302 it 'on' or 'off' their finger.

The personal razor 100 of the present invention can be fabricated from plastic, metal, elastomers, other suitable materials, or combinations thereof, as may be required and/or desired in a particular embodiment.

Referring to FIG. 2, there is illustrated one example of a perspective view of a personal razor 100. In an exemplary embodiment, a body 148 can be substantially v-shape having a left side 116A, a right side 116B, an exterior surface 136, an interior surface 138 (better illustrated in at least FIG. 9), an open end 128, and a closed end 126. A portion of the exterior surface 136 can be configured as a razor cartridge interface 124 proximate to the open end 128. The interior surface 138 forms two of an opposing entry surface 140 that is positioned proximate to the open end 128.

In an exemplary embodiment, at least one retaining clip 102A-B can be affixed along the exterior surface 136 proximate to the razor cartridge interface 124. A razor cartridge 110 can be fastened by way of the retaining clip 102A-B to the razor cartridge interface 124. The razor cartridge 110 comprises at least one razor cutting surface 108 that contacts the skin of a user 202 during the use of the personal razor 100 to effectuate shaving hair.

Figure 9:
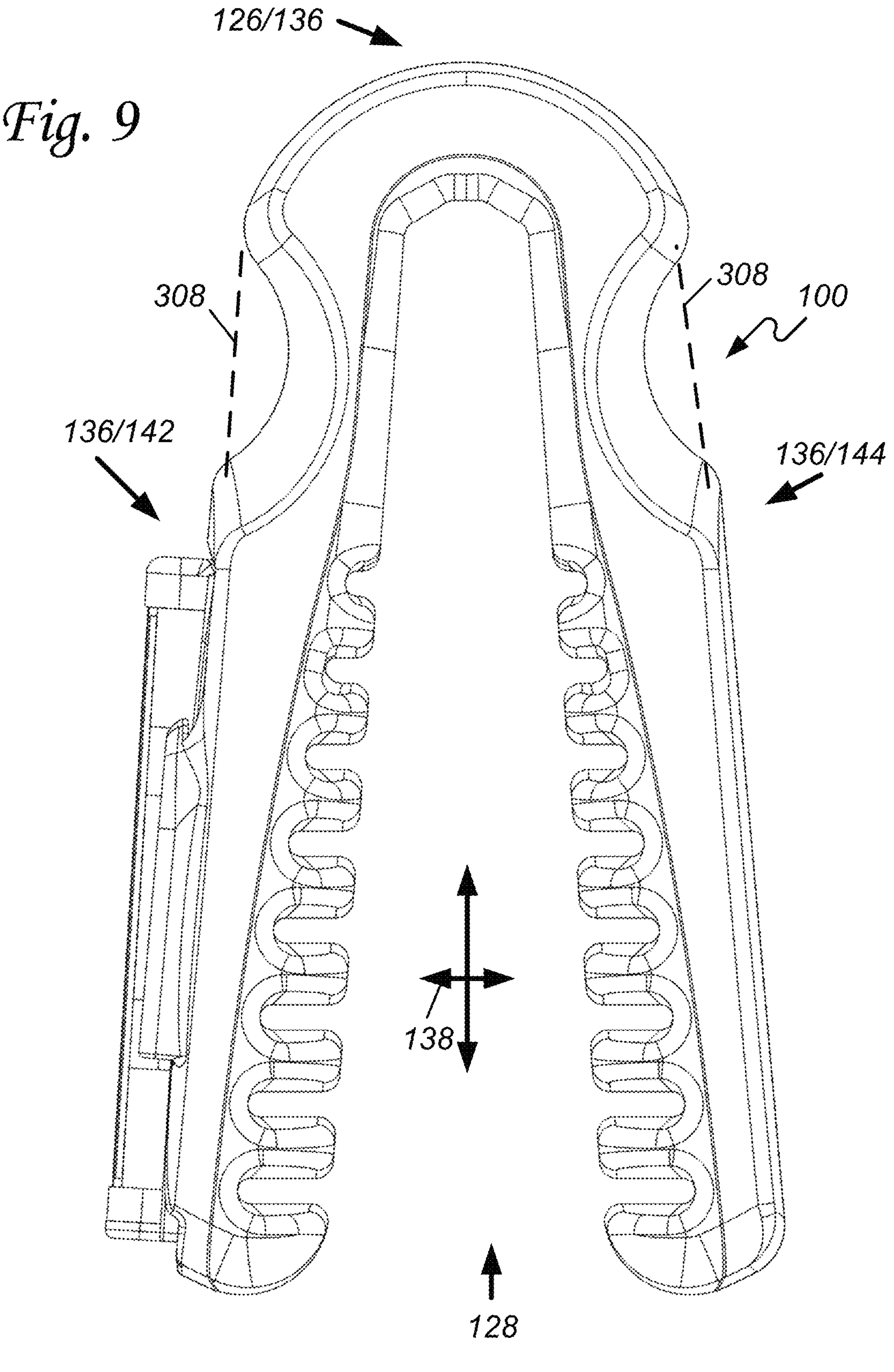
FIG. 9 illustrates one example of a right side view of a personal razor.

In an exemplary embodiment and illustrated better in at least FIG. 9, at least one contoured finger guide 120 can be recessed with respect to the top side 142 plane illustrated as reference lines 308 into the exterior surface 136 proximate to the closed end 124. In operation, by way of the contoured finger guides 120 user 202 can grip to align the personal razor 100 when sliding it 'on' or 'off' their finger. More than one contoured finger guide 120 can be implemented. In a preferred embodiment, as illustrated in at least FIGS. 2 and 9, contoured finger guides 120 can be opposed on the top side 142 proximate to the razor cartridge interface 124 and the bottom side 144. Both contoured finger guides 120 can be positioned proximate to the closed end 126.

In an exemplary embodiment and with reference to at least FIG. 2, in the recess of the contoured finger guide 120 can be a convex arch illustrated by reference line 324 between the left side 132 and the right side 130. In operation, the fingers of user 202 self-orientate along the surface of the convex arch 324 on entry into the contoured finger guide 120 whether gripped with the left or right hand of user 202 allowing the personal shaver 100 to be easily used by right-handed and left-handed users 202. In this regard, the convex arch 324 allows stabilizing and equal pressure to be applied by the left or right hand fingers of the user 202 when sliding the personal shaver 100 'on' or 'off' their finger.

In an exemplary embodiment, more than one ridge 112 can be disposed along each of the opposing entry surface 140 with at least a portion of ridges 112 positioned below the razor cartridge interface 124. In operation, a plurality of the ridges 112 grip the finger of the user 202 on insertion into the open end 128 of the personal razor 100, and orientation of the ridges 112 below the razor cartridge 110 enables user 202 to better control the motion, the angle of the razor cutting surface 108, and the downward pressure on skin of user 202 during use of the personal razor 100.

Many of the ridges 112 can traverse between the left side 132 and the right side 130. Additionally, ridges 112 can be organized into one or more rows of ridges 112, and between ridges 112 can be troughs 114. The troughs 114 can have a slightly raised center portion to promote egress of water that may ingress into the interior surface 138 during use. In this regard, draining away water from the interior surfaces 138 and the finger of the user 202 when in contact with the ridges 112 in order to maintain adequate grip between the finger of the user 202 and the ridges 112 so the operation of the personal razor 100 is not compromised in wet environments such as showers, and other wet environments. In this regard, an advantage in the present invention is that it can be used in wet or dry environments equally well.

In an exemplary embodiment, the center portion 146 of at least some of the ridges 112 can be wider and flatter than the end portions of the ridges 112 to increase the contact surface area with the finger of user 202 when inserted into the interior region 138. In this regard, the increased contact area with the finger of the user 202 improves grip, and fingertip control of the personal razor by the user 202.

Figure 3:
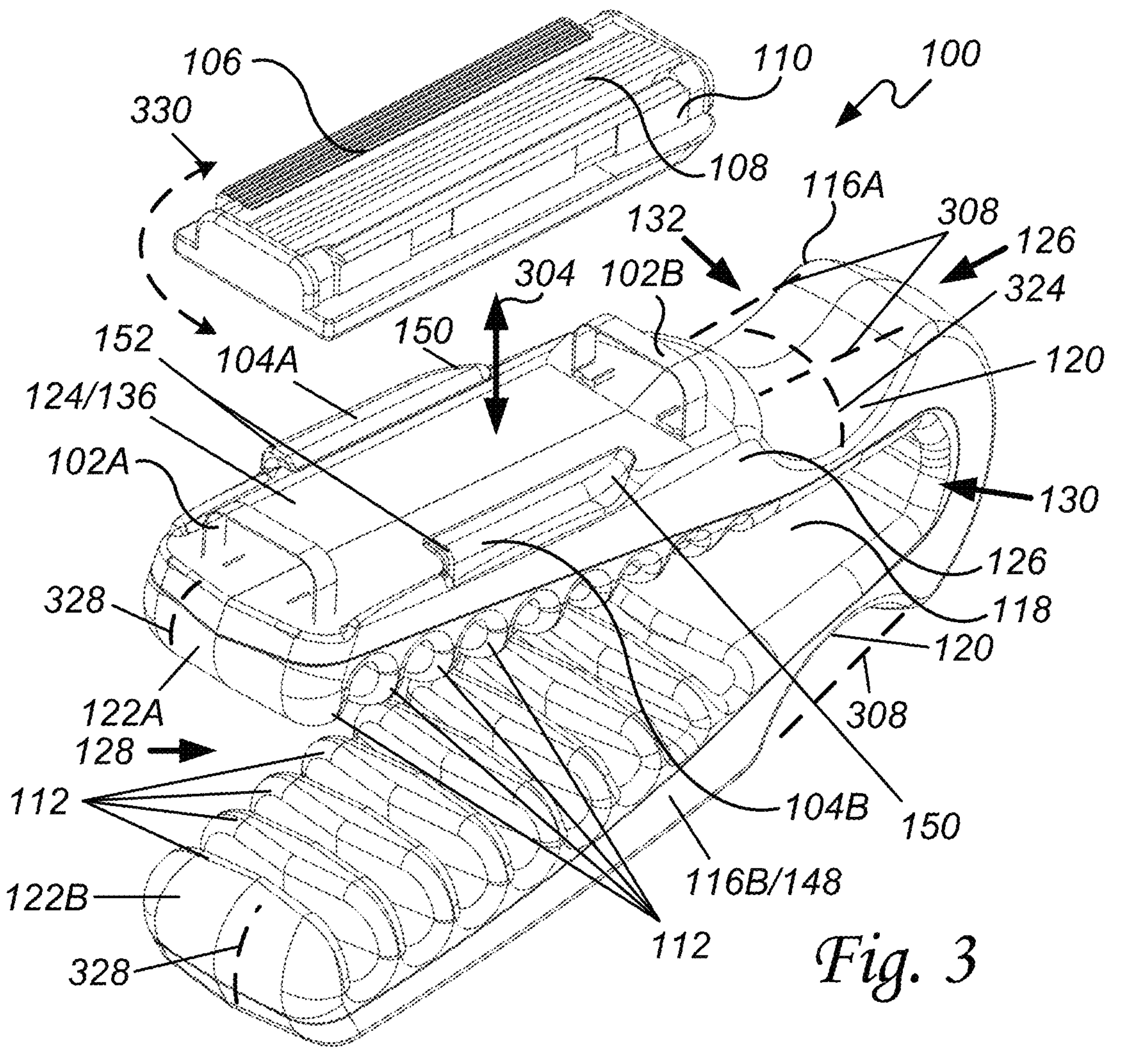
FIG. 3 illustrates one example of a disassembled view of a personal razor.

Referring to FIG. 3, there is illustrated one example of a disassembled view of a personal razor 100. In an exemplary embodiment, at least two angled retainer rails 104A-B can be positioned on opposing sides of the razor cartridge interface 124. In operation, the razor cartridge 110 slides into the angled retainer rails 104A-B and is secured from motion during use by the retaining clip 102A-B. In this regard, the angled retainer rails 104A-B interlock with the razor cartridge along the left side 132 and right side 130 of the body 148.

The angled retainer rails 104A-B can be integrally formed on each of the left side 116A/132 and right side 116B/130, or joined to the left side 116A/132 and right side 116B/130 in other ways.

In an exemplary embodiment, the angled retainer rails 104A-B can be formed with an open angle front 152 to allow the razor cartridge 110 to slide into the angled retainer rails 104A-B from the front. To prevent the razor cartridge from sliding too far back on the razor cartridge interface, the angled retainer rails 104A-B can be formed with a curved closed back 150. In this regard, the curve closed back stops the razor cartridge 110 from sliding backward as it is inserted from the front into the angled retainer rails 104A-B.

In an exemplary embodiment, the body 148 further comprises one or more contoured entry lips 122A-B along the edge of the body 148 proximate to the open end 128. In operation, the contoured entry lip 122A-B guides 328 the finger of the user 202 towards the center of the open end 128 during insertion into the interior surface 138 of the personal razor 100.

Figure 4:
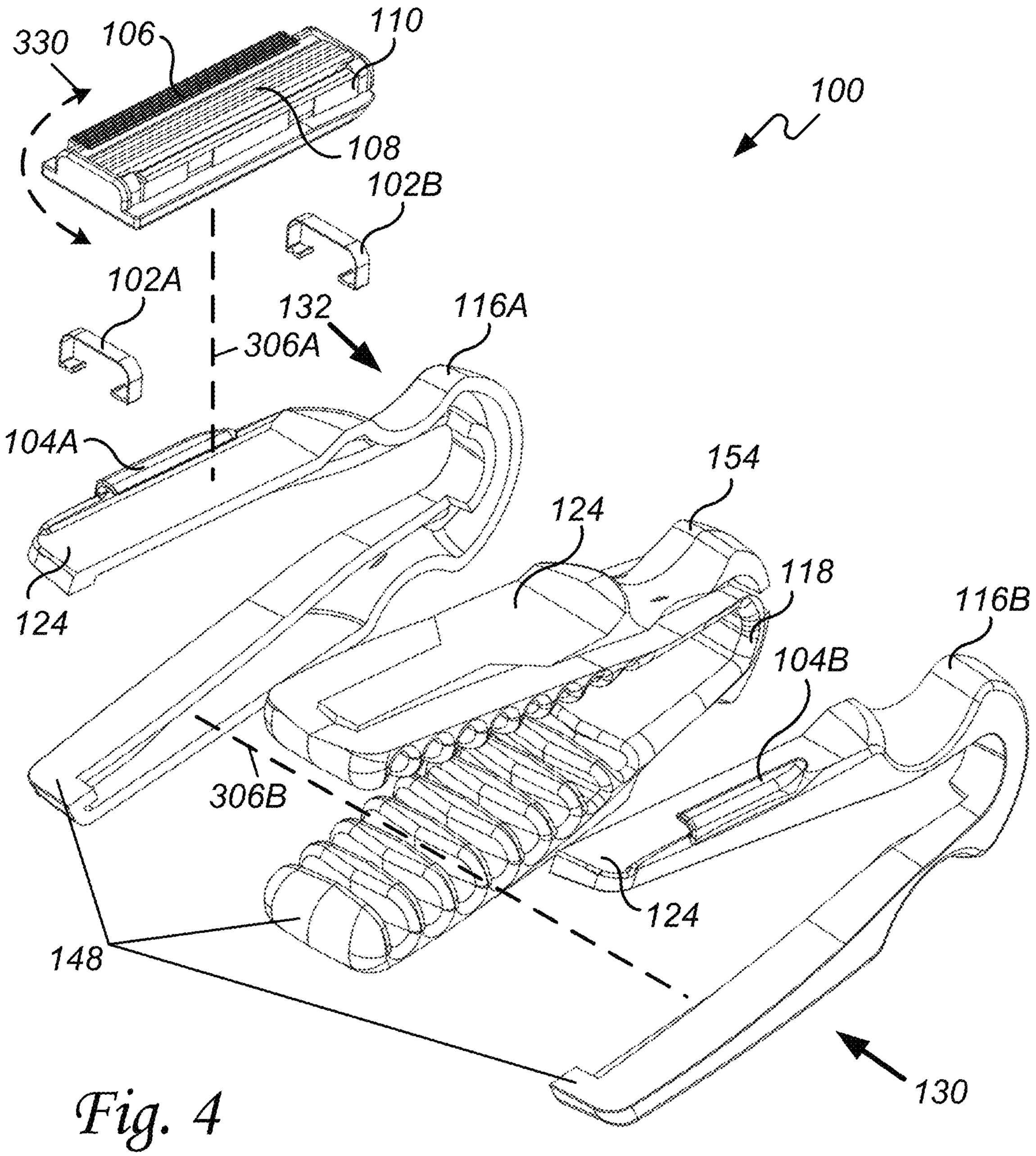
FIG. 4 illustrate one example of an exploded view of a personal razor.

Referring to FIG. 4, there is illustrated one example of an exploded view of the personal shaver 100. In an exemplary embodiment, an inner portion 118 can be enclosed 306B between a left side 116A/132 and right side 116B/130 and affixed together to form a body 148. A razor cartridge 110 and be oriented 330 for left-handed or right-handed user 202 use of the personal razor 100 and interconnected 306A by way of retaining clips 102A-B and/or angled retainer rails 104A-B to the razor cartridge interface 124.

The personal razor 100 of the present invention can be fabricated from plastic, metal, elastomers, other suitable materials, or combinations thereof, as may be required and or desired in a particular embodiment.

In an exemplary embodiment, the razor cartridge can comprise the razor cutting surface 108 such as a razor blade and a gliding surface 106. In operation, the gliding surface 106 can glide along the surface of the skin of the user 202 and aid in keeping the razor cutting surface 108 from digging into the skin of the user 202 causing abrasion and in extreme cases cutting of the skin rather than the hair at the surface of the skin.

Figure 5:
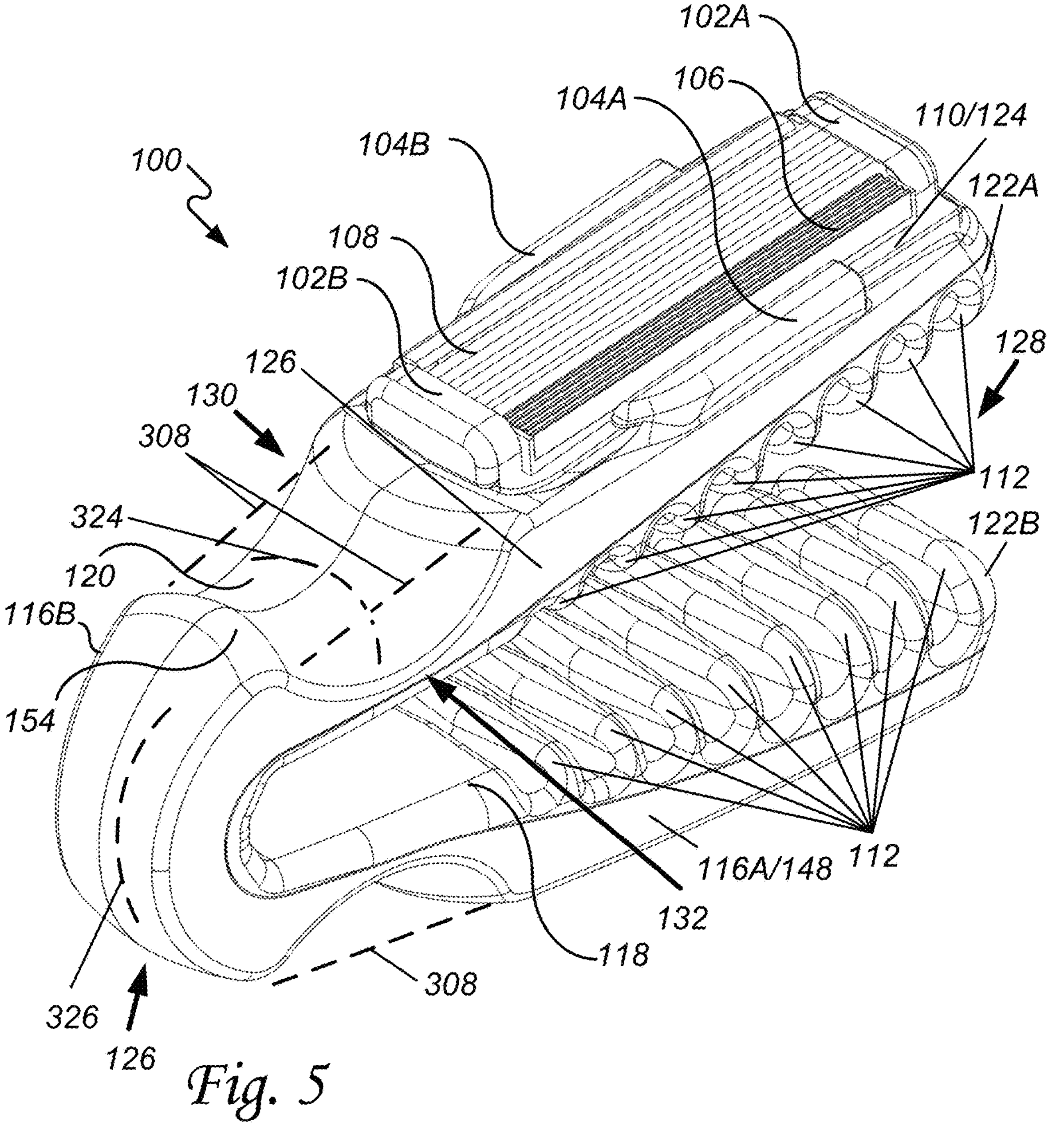
FIGS. 5-7 illustrate examples of perspective views of a personal razor.

Referring to FIG. 5, there is illustrated one example of a rear-left perspective view of a personal razor 100. In an exemplary embodiment, the personal razor 100 for shaving can comprise a body 148 that is substantially v-shape having a left side 132, a right side 130, an exterior surface 136, an interior surface 138, an open end 128, and a closed end 126 as better illustrated in at least FIG. 9. A portion of the exterior surface 136 is configured as a razor cartridge interface 124 proximate to the open end 128. The interior surface 138 forms two of an opposing entry surface 140 positioned proximate to the open end 128 as better illustrated in at least FIG. 8.

The personal razor 100 can further comprise at least one of a retaining clip 102A-B affixed along the exterior surface 136 proximate to the razor cartridge interface 124, and a razor cartridge 110 can be fastened by way of the retaining clips 102A-B to the razor cartridge interface 124. The razor cartridge 110 comprises at least one of a razor cutting surface 108 that contacts the skin of user 202 during use of the personal razor 100.

The personal razor 100 further comprises, more than one ridge 112 disposed along each of the opposing entry surface 140 with at least a portion of the ridge 112 positioned below the razor cartridge interface 124. Many of the ridges 112 traverse between the left side 132 and the right side 130. The center portion 146 of many of the ridges 112 is wider and flatter than the end portions of the ridges 112 increasing the contact surface area with the finger of the user 202 when inserted into the interior region 138 as better illustrated in at least FIG. 2. In operation, a plurality of the ridges 112 grip the finger of the user 202 on insertion into the open end 128 of the personal razor 100 and orientation of the ridges 112 below the razor cartridge 110 enables the user 202 to better control motion, the angle of the razor cutting surface 108, and downward pressure on the skin of user 202 during use of the personal razor 100.

In an exemplary embodiment, the body 148 can comprise at least one of at least one contoured finger guide 120. The contoured finger guide 120 can be recessed into the exterior surface 136 proximate to the closed end 126. In operation, by way of the contoured finger guide 102 user 202 can grip to align the personal razor 100 when sliding it 'on' or 'off' their finger.

Figure 6:
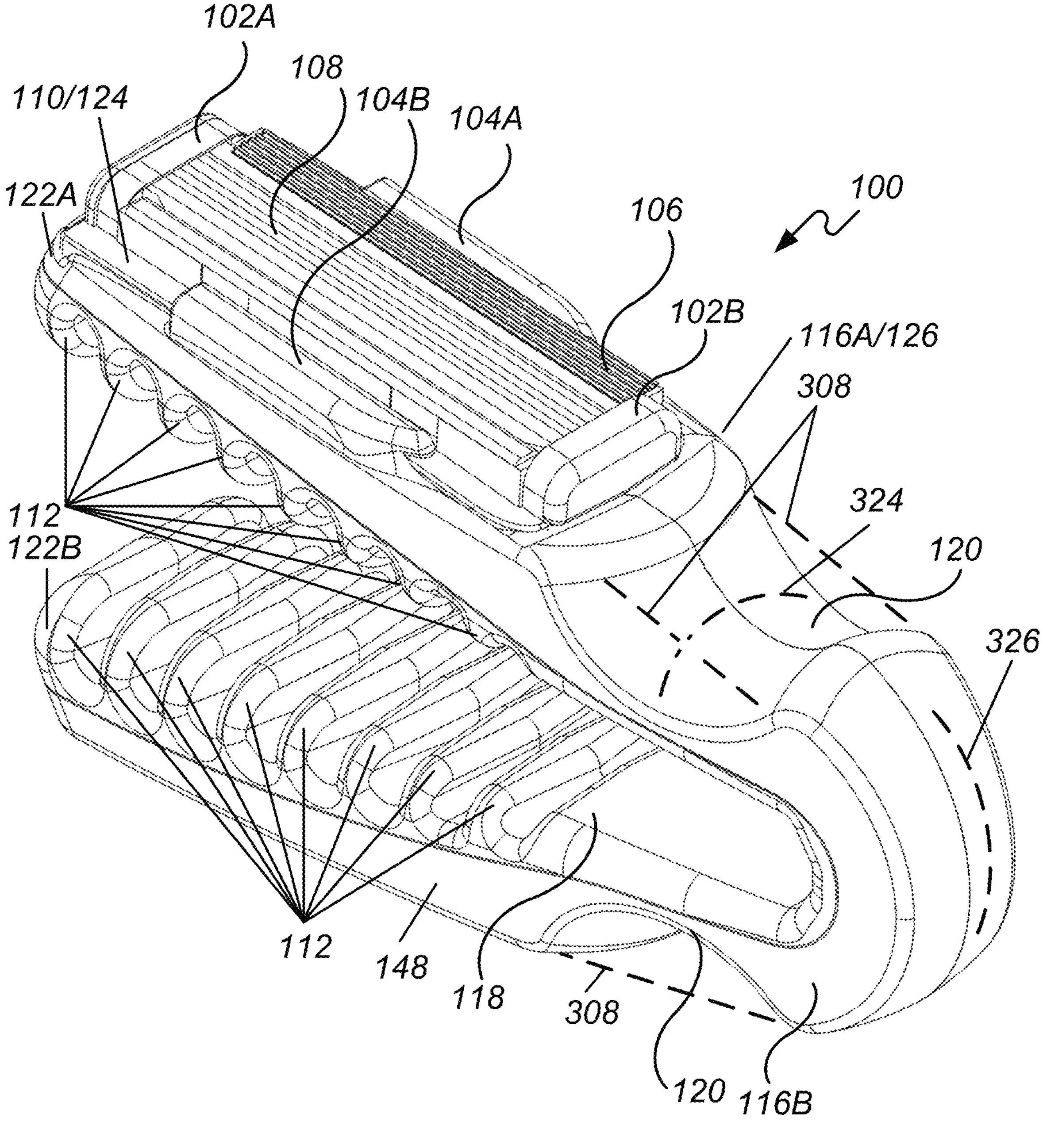
Figure 7:
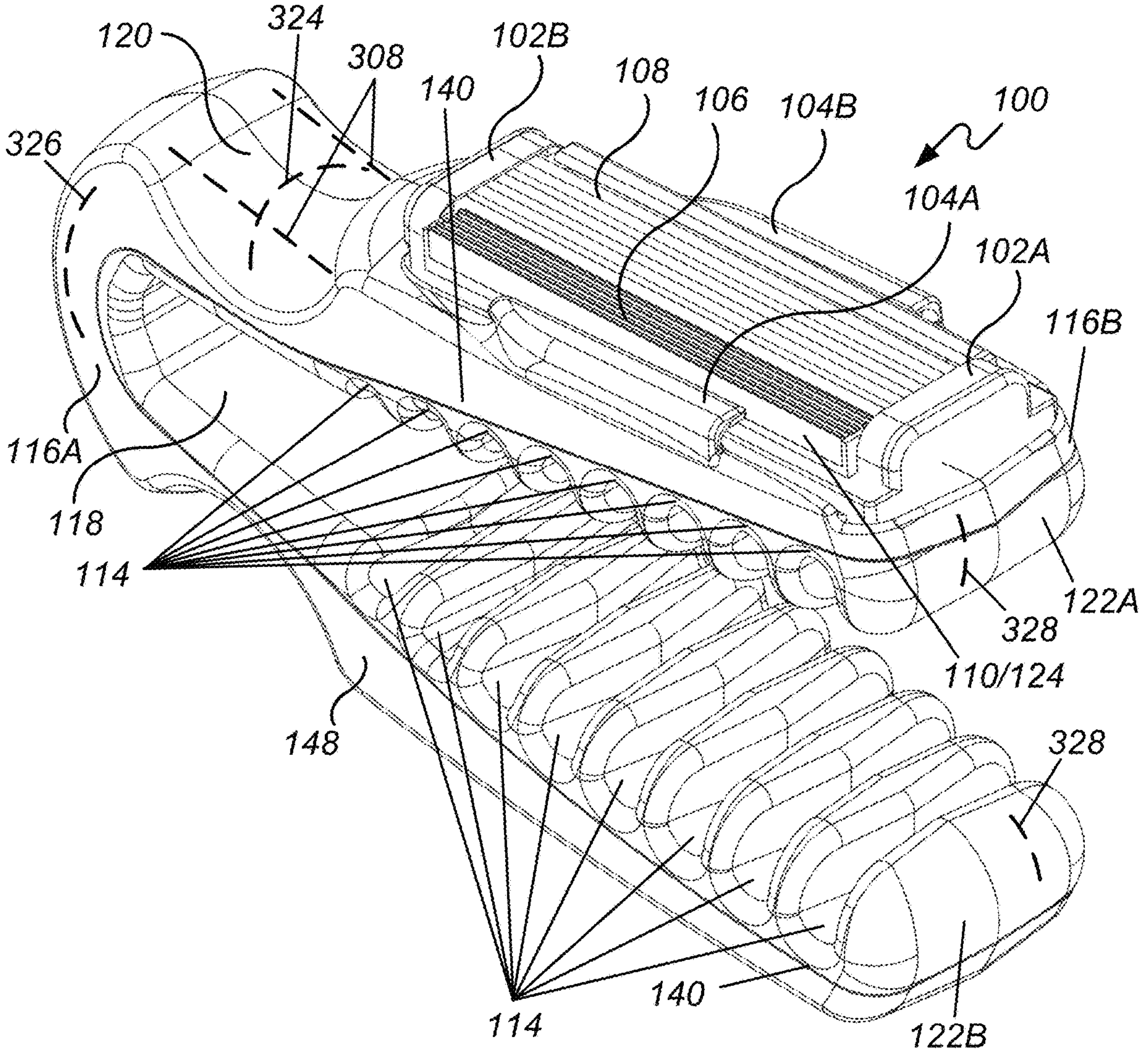

Referring to FIG. 6, there is illustrated one example of a rear-right perspective view of a personal razor 100. Referring to FIG. 7, there is illustrated one example of a front-left perspective view of a personal razor 100. In an exemplary embodiment, the closed end 126 of the body 148 can be shaped as a palm arch 326. In this regard, when user 202 grips the personal razor 100 by way of the contoured finger guides 120 the palm arch 326 fits comfortably in the hand of the user 202 in the natural curve in the hand that is created when the index finger and thumb are both extended. In operation, the palm arch 326 is stretched slightly when the finger of user 202 is inserted into the open end 128. Once the finger of the user 202 is inserted, the palm arch 326 applies a squeezing pressure 310, with the aid of ridges 112, holding the personal razor 100 in position on the finger of user 202 during use.

Figure 8:
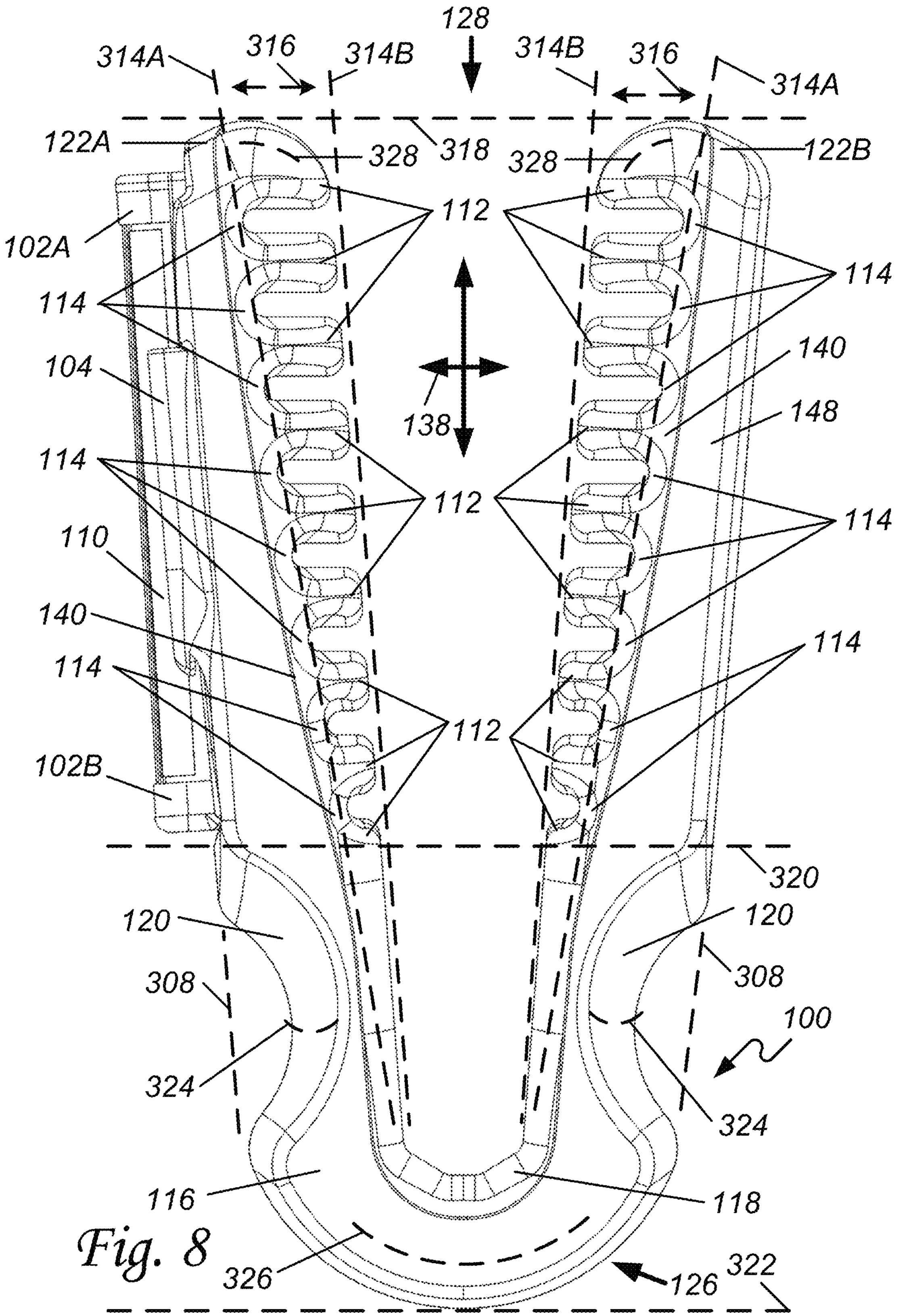
FIG. 8 illustrates one example of a left side view of a personal razor.

Referring to FIG. 8, there is illustrated one example of a left side 132 view of a personal razor 100. In an exemplary embodiment, each ridge 112 can be of different length, with respect to the interior surface 138 reference line 314A, with the longest of ridges 112 being proximate to the open end 128. In this regard, peaks 314B of each of the ridges 112 are aligned to form a mostly flat surface which the finger of the user 202 is squeezed 310 between during use of the personal razor 100. An advantage in the present invention is that by creating mostly flat ridges 112, peak 314B more ridges are in contact with and the pressure is more uniformly distributed across the length of the finger of the user 202 promoting better grip, control, and equal force applied to the skin of the user 112 when using the personal razor 100.

In an exemplary embodiment, reference line 322 is proximate the closed end 126 and tangent to the palm arch 326. Reference line 320 is proximate the intersection between the rows of ridges, the razor cartridge 110, and the contoured finger guides 120. Reference line 318 is proximate to the open end 128 and the contoured entry lips 122A-B.

In an exemplary embodiment, the distance between reference lines 322 and 320 which span the palm arch 326 and the contoured finger guide 120 can be in the range of 2.5 inches to 4 inches, and preferably in the range of 3 inches to 3.5 inches. The distance between reference lines 320 and 318 which spans the razor cartridge 110 and the rows of ridges 112 can be in the range of 3.5 inches to 6 inches and preferably in the range of 4 inches to 5 inches. The distance between the reference lines 322 and 318 which span the entire length of the personal razor can be in the range of 5 inches to 9 inches and preferably in the range of 6.5 inches to 8 inches. With reference to at least FIG. 10, the width from the left side 132 reference line 332 to the right side 130 reference line 334 spanning the width of the personal razor 100 can be in the range of 2.75 inches to 5 inches and preferably in the range of 3.5 inches to 4.5 inches. The personal razor 100 can be manufactured to other dimensions and specifications without limitation, as may be required and/or desired in a particular embodiment.

Figure 10:
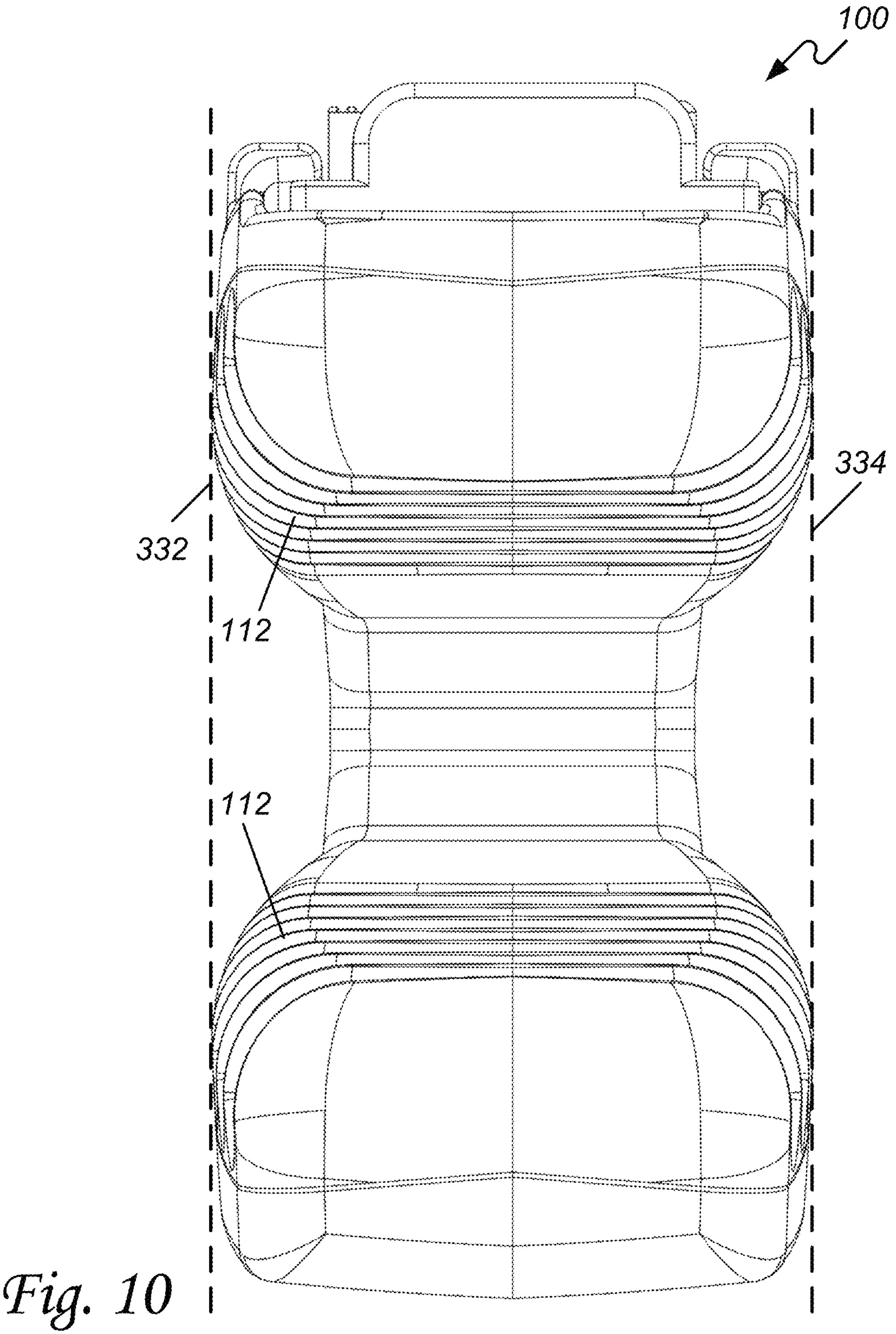
FIG. 10 illustrates one example of a front view of a personal razor.
Figure 11:
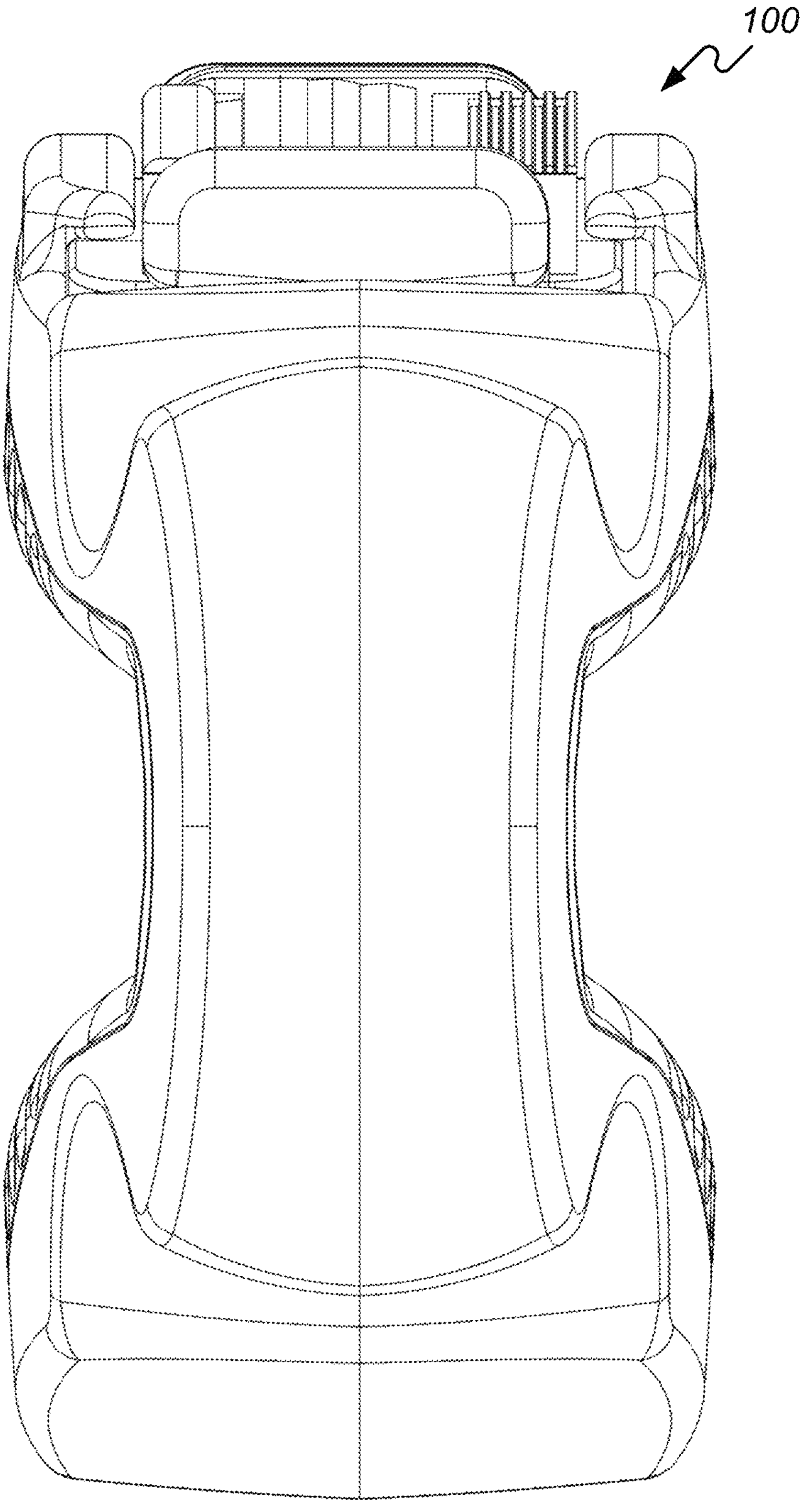
FIG. 11 illustrates one example of a back view of a personal razor.
Figure 12:
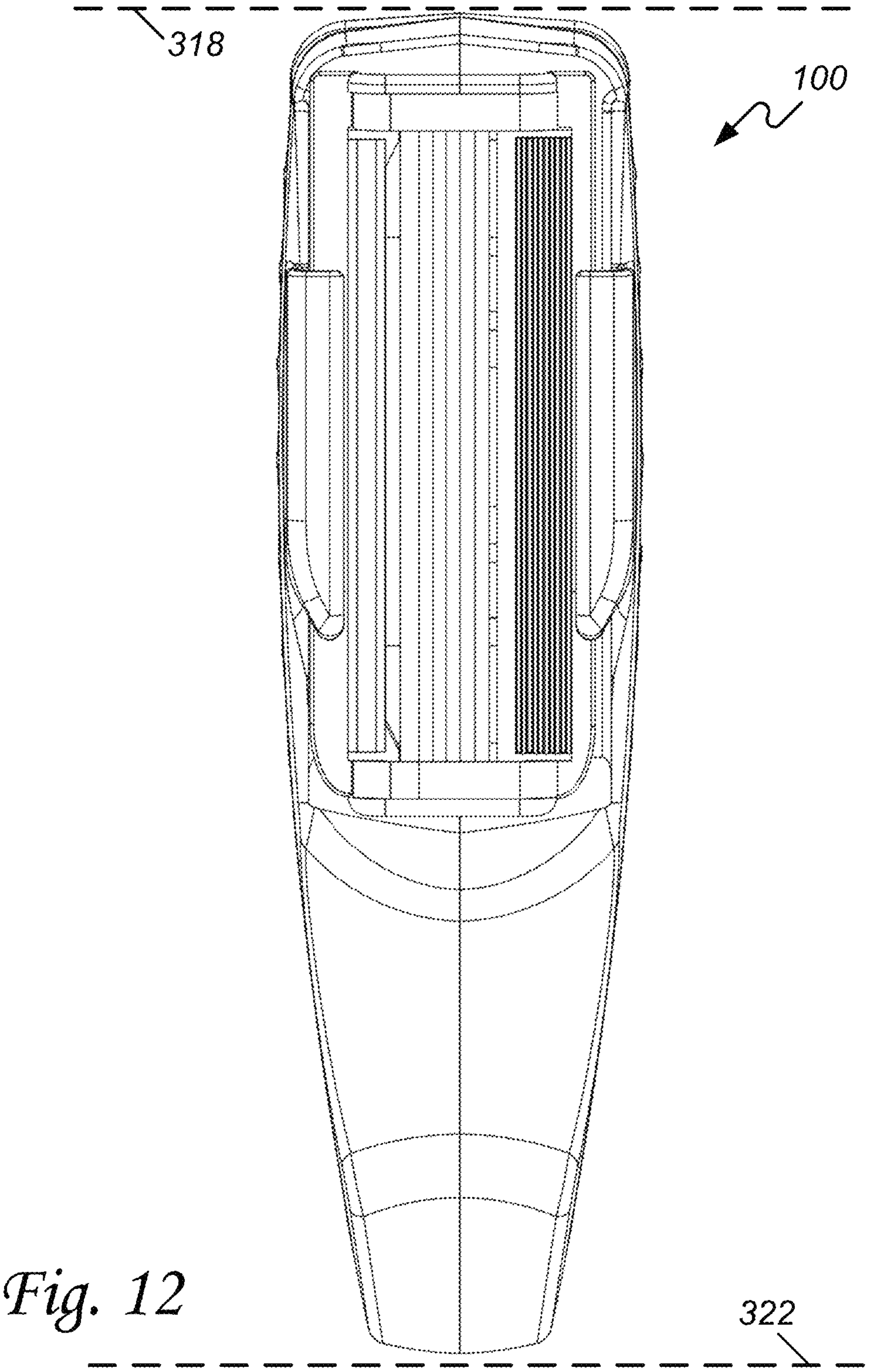
FIG. 12 illustrates one example of a top view of a personal razor.
Figure 13:
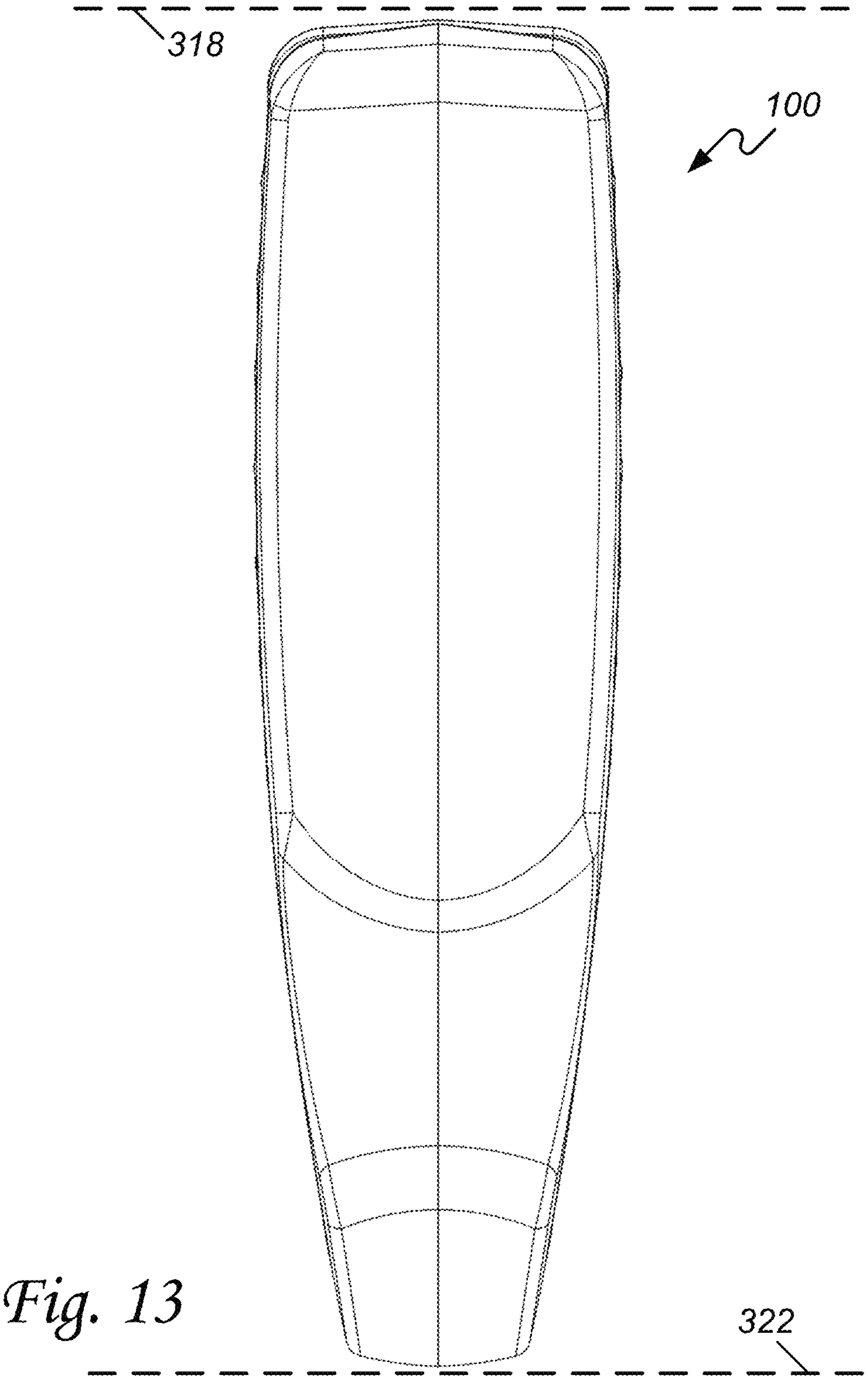
FIG. 13 illustrates one example of a bottom view of a personal razor.

Referring to FIG. 9, there is illustrated one example of a right side 130 view of a personal razor 100. Referring to FIG. 10, there is illustrated one example of a front view of a personal razor 100. Referring to FIG. 11, there is illustrated one example of a back view of a personal razor 100. Referring to FIG. 12 there is illustrated one example of a top view of a personal razor 100. Referring to FIG. 13 there illustrated one example of a bottom view of a personal razor 100.

Figure 14:
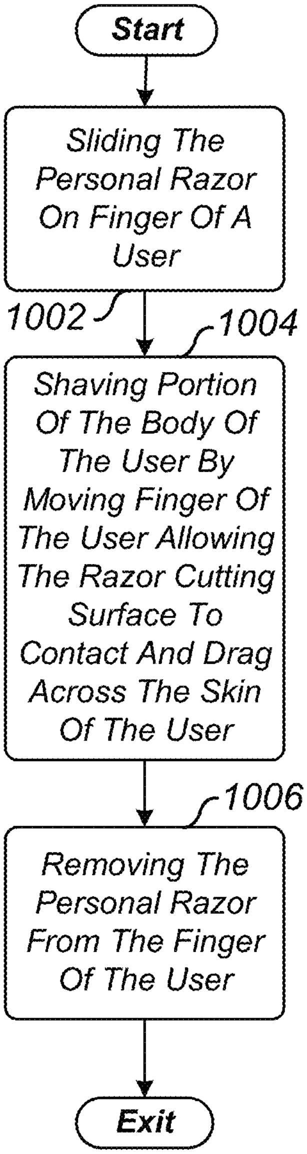
FIG. 14 illustrates one example of a method of using a personal razor.

Referring to FIG. 14, there is illustrated one example of a method of using a personal razor 100. In an exemplary embodiment, the method begins in step 1002 by sliding the personal razor 100 on the finger of user 202 by way of contoured finger guides 120. The contoured finger guides 120 allow the user 202 to grip to align the personal razor 100 when sliding the personal razor 100 'on' the finger of user 202 in preparation for use of the personal razor 100 for shaving.

In an exemplary embodiment, the personal razor 100 comprises a body 148 that is substantially v-shape having a left side 132, a right side 130, an exterior surface 136, an interior surface 138, an open end 128, and a closed end 126. A portion of the exterior surface 136 can be configured as a razor cartridge interface 124 proximate to the open end 128. The interior surface 138 forms two opposing entry surfaces 140 indicated by reference lines 314A in at least FIG. 8 that are positioned proximate to the open end 128. At least one retaining clip 102A-B can be affixed along the exterior surface 136 proximate to the razor cartridge interface 124 as better illustrated in at least FIG. 3.

A razor cartridge 110 can be fastened by way of the retaining clips 102A-B to the razor cartridge interface 124. The razor cartridge 110 comprises at least one razor cutting surface 108 such as a razor blade or other suitable razor cutting surface. As better illustrated in at least FIG. 9, at least one of the contoured finger guides 120 can be recessed with respect to the top side 142 plane illustrated as reference line 308 into the exterior surface 136 proximate to the closed end 124. More than one ridge 112 can be disposed along each of the opposing entry surface 140 indicated by reference line 314A in at least FIG. 8 with at least a portion of the ridges 112 positioned below the razor cartridge interface 124.

In operation, the plurality of ridges 112 grip the finger of user 202 on insertion into the open end 128 of the personal razor 100 and orientation of the ridges 112 below the razor cartridge 110 enables user 202 to better control motion, angle of the razor cutting surface 108, and downward pressure on the skin of user 202 during use of the personal razor 100. The method then moves to step 1004.

In step 1004, a portion of the body of user 202 is shaved by moving the finger of user 202 allowing the razor cutting surface 108 to contact and drag across the skin of user 202. The method then moves to step 1006.

In step 1006, at the completion of shaving, the personal razor 100 can be removed from the finger of user 202 by way of the contoured finger guides 120 which enable user 202 to grip the personal razor 100 when sliding it 'off' the finger of user 202. The method is then exited.

In an alternative exemplary embodiment, the method begins in step 1002 by sliding the personal razor 100 on the finger of user 202 in preparation for the use of the personal razor 100. The personal razor 100 comprises a body 148 that is substantially v-shape having a left side 132, a right side 130, an exterior surface 136, an interior surface 138, an open end 128, and a closed end 126. A portion of the exterior surface 136 can be configured as a razor cartridge interface 124 proximate to the open end 128. The interior surface 138 forms two opposing entry surfaces 140 indicated by reference line 314A in at least FIG. 8 that are positioned proximate to the open end 128. At least one retaining clip 102A-B can be affixed along the exterior surface 136 proximate to the razor cartridge interface 124 as better illustrated in at least FIG. 3.

A razor cartridge 110 can be fastened by way of the retaining clip 102A-B to the razor cartridge interface 124. The razor cartridge 110 comprises at least one razor cutting surface 108 such as a razor blade or other suitable razor cutting surface that contacts the skin of a user during use of the personal razor 100, and more than one ridge 112 can be disposed along each of the opposing entry surface 140 with at least a portion of the ridges 112 positioned below the razor cartridge interface 124. Many of the ridges 112 traverse between the left side 12 and the right side 130. The center portion 146 of many of the ridges 112 can be wider and flatter than the end portions of the ridges 112 increasing the contact surface area with the finger of user 202 when inserted into the interior region 138.

In operation, a plurality of the ridges 112 grip the finger of user 202 on insertion into the open end 128 of the personal razor 100 and orientation of ridges 112 below the razor cartridge 110 enables user 202 to better control motion, angle of the razor cutting surface, and downward pressure on the skin of user 202 during use of the personal razor 100. The method then moves to step 1004.

In step 1004, a portion of the body of user 202 is shaved by moving the finger of user 202 allowing the razor cutting surface 108 to contact and drag across the skin of user 202. The method then moves to step 1006.

In step 1006, at the completion of shaving, the personal razor 100 can be removed from the finger of user 202 sliding it 'off' the finger of user 202. The method is then exited.

Figure 15:
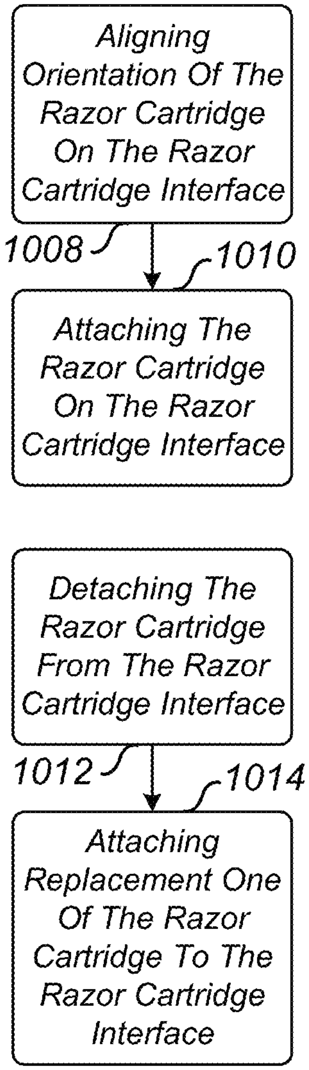
FIG. 15 illustrates exemplary embodiments that can be used interchangeably with the methods of the present invention.

Referring to FIG. 15, there are illustrated exemplary embodiments that can be used interchangeably with the methods of the present invention.

In step 1008, the razor cartridge 110 is aligned and orientated 330 on the razor cartridge interface 124 for left or right-hand use of the personal razor 100 by user 202. In this regard, the razor cartridge 110 can have the razor cutting surface 108 orientated 330 at a slight angle to promote more effective shaving. This angle while convenient for a right-handed user 202, as an example, might not be so comfortable for a left-handed user 202 because the razor cutting surface 108 is oriented at the wrong angle. As such, by rotating 330 the razor cartridge 110 180-degrees and thus rotating the razor cutting surface 108, the orientation of the razor cutting surface 108 is now better aligned for the left-handed user 202. The method then moves to step 1010.

In step 1010, the razor cartridge 110 can be attached to the razor cartridge interface 124, wherein the user 202 can use the personal razor 100 for shaving.

In step 1012, the razor cartridge 110 can be detached from the razor cartridge interface 124. In this regard, user 202 can depress the release trigger 154 causing the retaining clip 102 to separate enough to allow the razor cartridge to be slipped out or otherwise separated from the razor cartridge interface 124. The method then moves to step 1014.

In step 1014, a replacement one of the razor cartridge 110 can be attached to the razor cartridge interface 124, wherein the user 202 can use the personal razor 100 for shaving.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A personal razor for shaving comprising:

a body that is substantially v-shape having a first side, a second side, an exterior surface, an interior surface, an open end, and a closed end, a portion of the exterior surface is configured as a razor cartridge interface proximate to the open end, the interior surface forms two of an opposing entry surface portion positioned proximate to the open end;

more than one retaining clip is affixed along the exterior surface proximate to the razor cartridge interface;

a razor cartridge is fastened by way of the more than one retaining clip to the razor cartridge interface, a respective one of the retaining clips is positioned at each end of the razor cartridge, the razor cartridge comprises at least one razor cutting surface that contacts the skin of a user during use of the personal razor;

more than one angled retainer rail, at least one of the angled retaining rails is respectively positioned on opposing sides of the razor cartridge interface and between the more than one retaining clips, the razor cartridge slides into the at least two of the angled retaining rails and is secured from motion during use by the more the one retaining clips;

at least one contoured finger guide is recessed into the exterior surface proximate to the closed end, wherein by way of the at least one contoured finger guide the user can grip to align the personal razor when sliding 'on' or 'off' the finger of the user; and more than one ridge with a gap between each of the more than one ridges, the more than one ridges are integrally formed on each of the opposing entry surface portions with a plurality of the more than one ridges positioned opposed to the razor cartridge interface, wherein a plurality of the more than one ridges grip the finger of the user on insertion into the open end of the personal razor.

2. The personal razor in accordance with claim 1, the recess of the at least one contoured finger guide is contoured as a convex arch between the first side and the second side.

3. The personal razor in accordance with claim 1, the more than one ridges traverse between the first side and the second side.

4. The personal razor in accordance with claim 1, center portion of the more than one ridges is wider and flatter than each end portion increasing contact surface area with the finger of the user when inserted into the interior region.

5. The personal razor in accordance with claim 1, each of the more than one ridges is of a different length with a longest of the more than one ridges proximate to the open end, wherein a peak of each of the more than one ridges are colinear, the finger of the user is squeezed between the more than one ridges during use of the personal razor.

6. The personal razor in accordance with claim 1, the closed end of the body is shaped as a palm arch;

wherein the user grips the personal razor by way of the at least one contoured finger guide; and wherein the palm arch is stretched slightly when the finger of the user is inserted into the open end, the palm arch applies a squeezing pressure holding the personal razor in position on the finger of the user during use.

7. The personal razor in accordance with claim 1, the body further comprises:

a contoured entry lip is integrally formed on one of the ridges that is proximate to the open end.

8. A method of using the personal razor of claim 1, the method comprising the steps of:

sliding the personal razor onto the finger of the user by way of the at least one contoured finger guide that the user can grip to align the personal razor when sliding 'on' the finger of the user in preparation for use of the personal razor;

shaving a portion of the body of the user by moving the finger of the user allowing the razor cutting surface to contact and drag across the skin of the user; and removing the personal razor from the finger of the user when finished shaving.

9. The method in accordance with claim 8, further comprising the steps of:

aligning an orientation of the razor cartridge on the razor cartridge interface for left or right handed use of the personal razor by the user; and attaching the razor cartridge to the razor cartridge interface.

10. The method in accordance with claim 8, further comprising the steps of:

detaching the razor cartridge from the razor cartridge interface; and attaching a replacement razor cartridge to the razor cartridge interface.

11. A personal razor for shaving comprising:

a body that is substantially v-shape having a first side, a second side, an exterior surface, an interior surface, an open end, and a closed end, a portion of the exterior surface is configured as a razor cartridge interface proximate to the open end, the interior surface forms two of an opposing entry surface portion positioned proximate to the open end;

more than one retaining clip is affixed along the exterior surface proximate to the razor cartridge interface;

a razor cartridge is fastened by way of the more than one retaining clip to the razor cartridge interface, a respective one of the retaining clips is positioned at each end of the razor cartridge, the razor cartridge comprises at least one razor cutting surface that contacts the skin of a user during the use of the personal razor;

more than one angled retainer rail, at least one of the angled retaining rails is respectively positioned on opposing sides of the razor cartridge interface and between the more than one retaining clips, the razor cartridge slides into the more than one angled retainer rails and is secured from motion during use by the more than one retaining clips; and more than one ridge with a gap between each of the more than one ridges, the more than one ridges are integrally formed on each of the opposing entry surface portions with a plurality of the more than one ridges positioned opposed to the razor cartridge interface, the more than one ridges traverse between the first side and the second side, center portion of the more than one ridges is wider and flatter than each end portion increasing contact surface area with the finger of the user when inserted into the interior region, wherein plurality of the more than one ridges grip the finger of the user on insertion into the open end of the personal razor.

12. The personal razor in accordance with claim 11, the body comprises:

at least one contoured finger guide is recessed into the exterior surface proximate to the closed end, wherein by way of the at least one contoured finger guide the user can grip to align the personal razor when sliding 'on' or 'off' the finger of the user.

13. The personal razor in accordance with claim 12, the closed end of the body is shaped as a palm arch, wherein the palm arch is stretched slightly when the finger of the user is inserted into the open end, the palm arch applies a squeezing pressure holding the personal razor in position on the finger of the user during use.

14. The personal razor in accordance with claim 12, the recess of the at least one contoured finger guide is contoured as a convex arch between the first side and the second side.

15. The personal razor in accordance with claim 11, each of the more than one ridges is of different length with a longest of the more than one ridges proximate to the open end, wherein a peak of each of the more than one ridges are colinear, the finger of the user is squeezed between the more than one ridges during use of the personal razor.

16. The personal razor in accordance with claim 11, the body further comprises:

a contoured entry lip is integrally formed on one of the ridges that is proximate to the open end.

17. The personal razor in accordance with claim 11, the razor cartridge further comprises at least one gliding surface that contacts the skin of the user during use of the personal razor.

18. A method of using the personal razor of claim 11, the method comprising the steps of:

sliding the personal razor onto the finger of the user in preparation for use of the personal razor;

shaving a portion of the body of the user by moving the finger of the user allowing the razor cutting surface to contact and drag across the skin of the user; and removing the personal razor from the finger of the user when finished shaving.

19. The method in accordance with claim 18, further comprising the steps of:

aligning an orientation of the razor cartridge on the razor cartridge interface for left or right handed use of the personal razor by the user; and attaching the razor cartridge to the razor cartridge interface.

20. The method in accordance with claim 18, further comprising the steps of:

detaching the razor cartridge from the razor cartridge interface; and attaching a replacement razor cartridge to the razor cartridge interface.

* * * * *